United States Patent
Hsieh

(10) Patent No.: US 7,595,840 B2
(45) Date of Patent: **\*Sep. 29, 2009**

(54) APPARATUS AND METHOD FOR DISPLAYING AND CONTROLLING A SYMMETRY-TYPE OSD MENU IN AN IMAGE DISPLAY DEVICE

(75) Inventor: Kuan-Hong Hsieh, Fullerton, CA (US)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 584 days.

This patent is subject to a terminal disclaimer.

(21) Appl. No.: 11/172,683

(22) Filed: Jul. 1, 2005

(65) Prior Publication Data

US 2006/0001772 A1 Jan. 5, 2006

Related U.S. Application Data

(63) Continuation-in-part of application No. 11/024,899, filed on Dec. 28, 2004, now Pat. No. 7,477,322.

(30) Foreign Application Priority Data

Jul. 5, 2004 (CN) .................. 2004 1 0028021

(51) Int. Cl.
*H04N 5/50* (2006.01)
(52) U.S. Cl. .................................... 348/569
(58) Field of Classification Search ......... 348/563–570, 348/511
See application file for complete search history.

(56) References Cited

U.S. PATENT DOCUMENTS

| | | | |
|---|---|---|---|
| 5,212,553 A | 5/1993 | Maruoka | |
| 5,673,087 A * | 9/1997 | Choi et al. | 348/511 |
| 5,838,386 A * | 11/1998 | Kim | 348/569 |
| 6,005,601 A * | 12/1999 | Ohkura et al. | 725/52 |
| 6,133,900 A * | 10/2000 | Esaki | 345/660 |
| 6,281,895 B1 * | 8/2001 | Jeong | 715/810 |
| 6,348,952 B1 * | 2/2002 | Jeong | 348/569 |
| 6,646,685 B1 * | 11/2003 | Kim | 348/569 |
| 6,856,332 B2 * | 2/2005 | Kim | 715/810 |
| 6,943,845 B2 * | 9/2005 | Mizutome et al. | 348/555 |
| 2004/0155982 A1 * | 8/2004 | Jeong | 348/565 |
| 2004/0165113 A1 * | 8/2004 | Kim et al. | 348/564 |
| 2005/0044507 A1 * | 2/2005 | Kim | 715/810 |
| 2006/0212665 A1 * | 9/2006 | Lin et al. | 711/154 |

\* cited by examiner

*Primary Examiner*—Paulos M Natnael
(74) *Attorney, Agent, or Firm*—Zhigang Ma

(57) ABSTRACT

An apparatus for displaying and controlling a symmetry-type OSD (on-screen display) menu in an image display device includes a key input unit (10), a control unit (11), an OSD menu generation unit (12), a storage unit (13), an image signal output unit (14), a pre-amplifier (15), an image output unit (16), and an image display device (17). The key input unit is for pressing to output command signals for displaying and controlling function control targets in the symmetry-type OSD menu. The control unit is for outputting control signals and control data to display and control the symmetry-type OSD menu according to the command signals. Each function control target includes related optional items, and can be expanded into its related optional items at an active area of the image display device. Further, each function control target can be displayed in a different size according to its display position.

14 Claims, 4 Drawing Sheets

APPARATUS AND METHOD FOR DISPLAYING AND CONTROLLING A SYMMETRY-TYPE OSD MENU IN AN IMAGE DISPLAY DEVICE

CROSS REFERENCE TO RELATED APPLICATION

This application is a continuation-in-part of a U.S. patent application Ser. No. 11/024,899 filed on Dec. 28, 2004 and entitled "APPARATUS AND METHOD FOR DISPLAYING AND CONTROLLING AN ON-SCREEN DISPLAY MENU IN AN IMAGE DISPLAY DEVICE", which is incorporated herein in its entirety by reference.

BACKGROUND OF THE INVENTION

1. Field of the Invention

The present invention relates to an on-screen display (OSD) apparatus and method, and particularly to an apparatus and method for displaying and controlling a symmetry-type OSD menu in an image display device such as a television.

2. General Background

In an image display device such as a television, parameters of the display such as volume, brightness, contrast, horizontal size, horizontal position, vertical size and vertical position can be adjusted by way of an OSD menu. The OSD menu is displayed on the screen of the device. A user can directly select and adjust a desired item shown on the screen, and visually confirm the adjustment.

FIG. 4 schematically illustrates a typical OSD menu displayed on a screen according to the prior art. The OSD menu has a plurality of symbols arranged in an elliptical ring, the symbols representing various parameters that can be adjusted. If a symbol is shaded, this indicates that the symbol has been selected by a user. A rectangular bar in the middle of the OSD menu represents a level meter of a selected parameter. A colored portion of the rectangular bar represents a current level of the parameter. The right side extremity of the colored portion fluctuates from left to right and back again according to adjustments made to the parameter.

The user can press a level increase button or a level decrease button, and thereby adjust the current level. Simultaneously, the user can view the result of the level adjustment on the level meter.

However, the level meter does not indicate exact adjustment values. It is difficult for the user to know the precise variation made by pressing the increase or decrease button. Additionally, all the optional items are simultaneously displayed on the OSD menu with the same size. The user can be confused, at least momentarily, as to which optional item is currently selected.

What is needed, therefore, is an apparatus and method which can display and control an OSD menu in an image display device, whereby adjustments to a display parameter are accurately shown to a user, and a display parameter currently selected is readily apparent to the user.

SUMMARY

An apparatus for displaying and controlling a symmetry-type OSD menu in an image display device in accordance with a preferred embodiment includes a key input unit, a control unit, an OSD menu generation unit, a storage unit, an image signal output unit, a pre-amplifier, an image output unit, and an image display device. The key input unit is for pressing to output command signals for displaying and controlling function control targets in the symmetry-type OSD menu. The control unit is for outputting control signals and control data to display and control the symmetry-type OSD menu on the image display device in accordance with the command signals. The OSD menu generation unit is for receiving the control signals and the control data, and displaying the symmetry-type OSD menu.

The storage unit is for storing the control data and configured information of each function control target and related optional items thereof. The image signal output unit is for outputting image signals R, G, B. The pre-amplifier is for converting the image signals and the OSD image signals to predetermined voltages and outputting the resultant values in accordance with a blanking signal BLK. The image output unit is for amplifying and outputting the resultant values. The image display device is for displaying the resultant values received from the image output unit.

Further, a method for displaying and controlling a symmetry-type OSD menu in an image display device is provided. The method includes the steps of: (a) outputting a command signal for displaying the symmetry-type OSD menu; (b) displaying the symmetry-type OSD menu according to the command signal; (c) determining whether a desired optional item has been selected for adjustment; (d1) determining whether the symmetry-type OSD menu is required to be closed, if a desired optional item has not been selected for adjustment; or (d2) displaying the selected optional item in an active area of the image display device, if a desired optional item has been selected for adjustment; (e) determining whether an elapsed period of not receiving any command signals is more than a predetermined threshold period, if the symmetry-type OSD menu is not required to be closed; (f) keeping the asymmetry-type OSD menu displayed, if the elapsed period is not more than the predetermined threshold period; (g) determining whether a configuration value of the selected optional item is required to be adjusted; and (h) adjusting the configuration value of the selected optional item and storing the adjusted configuration value, if the configuration value of the selected optional item is required to be adjusted.

Other advantages and novel features will be drawn from the following detailed description with reference to the attached drawings, in which:

DETAILED DESCRIPTION OF THE EMBODIMENTS

Figure 1:
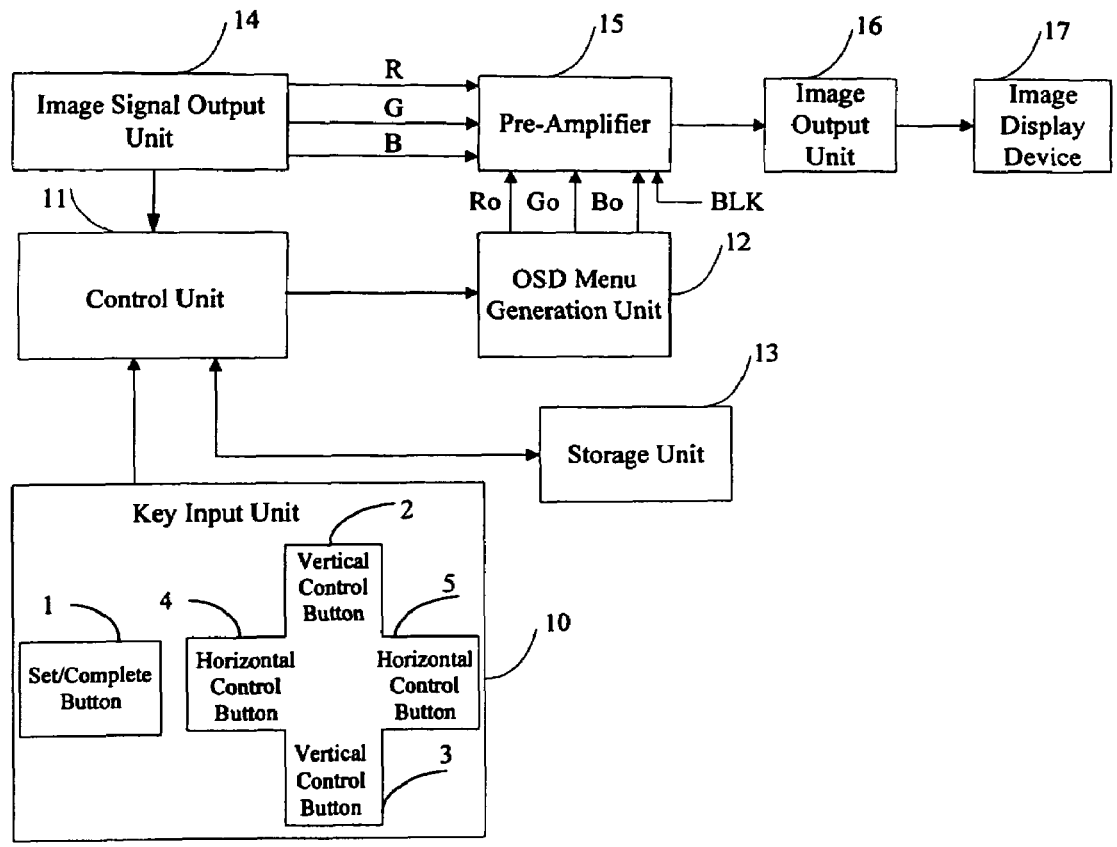
FIG. 1 is a block diagram of hardware infrastructure of an apparatus for controlling and displaying a symmetry-type OSD menu in accordance with a preferred embodiment of the present invention, the apparatus including an image display device.

FIG. 1 is a block diagram of hardware infrastructure of an apparatus for displaying and controlling a symmetry-type OSD menu (hereinafter, "the apparatus") in accordance with the preferred embodiment of the present invention. The apparatus includes a key input unit 10, a control unit 11, an OSD menu generation unit 12, a storage unit 13, an image signal output unit 14, a pre-amplifier 15, an image output unit 16, and an image display device 17.

The key input unit 10 outputs command signals for displaying and controlling function control targets in accordance with the manipulation (i.e., pressing) of any of a plurality of buttons thereof by a user. In the illustrated embodiment, the buttons are a set/complete button 1, vertical control buttons 2, 3, and horizontal control buttons 4, 5. The set/complete button 1 is for opening or closing the symmetry-type OSD menu. The vertical control buttons 2, 3 are for vertically moving through a series of optional items displayed in an active area of the symmetry-type OSD menu when the symmetry-type OSD menu is displayed on a display screen of the image display device 17, so as to reach a desired optional item. The horizontal control buttons 4, 5 are for horizontally adjusting the configuration value of any desired optional item. The control unit 11 outputs control signals and control data so as to display and control the symmetry-type OSD menu on the display screen of the image display device 17 in accordance with the command signals. The OSD menu generation unit 12 receives the control signals and the control data, and outputs OSD image signals $R_0$, $G_0$, $B_0$ corresponding to the respective function control targets, thereby causing the function control targets to be displayed on the screen as a symmetry-type OSD menu.

The storage unit 13 stores the control data, and configured information of each function control target and of related optional items of the function control target. The configured information of each function control target includes position coordinates and corresponding display symbols, so that the size of each function control target is variable in different position coordinates. The configured information of the related optional items includes configuration values, position coordinates, and corresponding display symbols at the active area of the symmetry-type OSD menu. The position coordinates indicate different positions through which the function control target or the related optional item is moved.

The image signal output unit 14 outputs image signals R, G, B. The pre-amplifier 15 converts the image signals R, G, B and the OSD image signals $R_0$, $G_0$, $B_0$ into predetermined voltages, and outputs resultant values in accordance with a blanking signal BLK. The image output unit 16 amplifies and outputs the resultant values. The image display device 17 displays the resultant values obtained from the image output unit 16.

Figure 2:
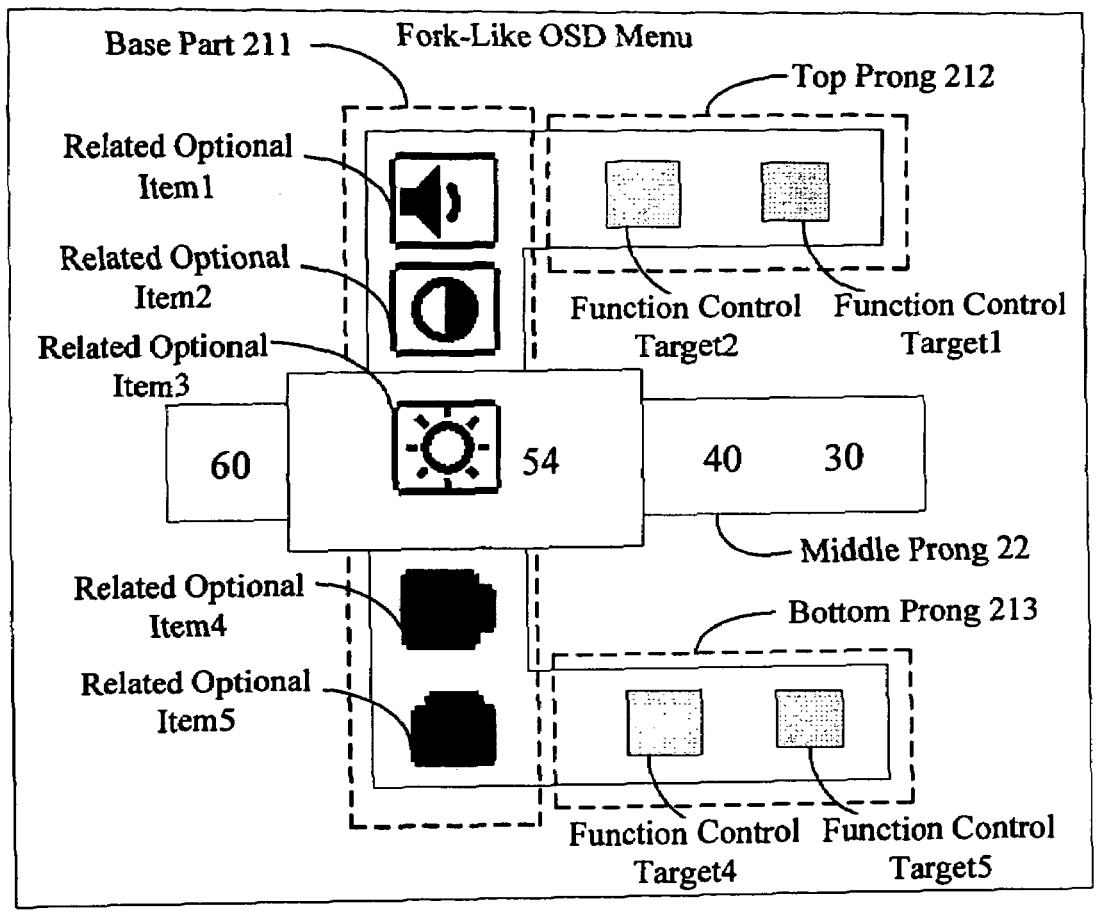
FIG. 2 is a schematic illustration of a fork-like OSD menu in accordance with the preferred embodiment of the present invention being displayed on a screen of the image display device, the fork-like OSD menu including a plurality of function control targets.

FIG. 2 is a schematic illustration of a fork-like OSD menu in accordance with the preferred embodiment of the present invention. However, the fork-like OSD menu illustrated and described hereinbelow should not be construed as limiting the invention. The fork-like OSD menu is provided by way of example only. In general, a symmetry-type OSD menu of the present invention may take any of various suitable forms as long as portions of the form on opposite sides of a dividing line or plane or about a center or an axis symmetrically correspond. In other words, the following description is with regard to the fork-like OSD menu illustrated, and for the sake of simplicity and convenience, other kinds of symmetry-type OSD menus in accordance with the preferred embodiment are not described. According to the preferred embodiment, the fork-like OSD menu includes N function control targets (N being any natural number). Each function control target has a set of related optional items, and may be represented by a particular symbol such as a figure, characters or a figure-character combination. The size of each function control target is variable according to the position of the function control target on the display screen. That is, the function control target is displayed in a larger size when its position is at the active area of the screen. In contrast, the function control target is displayed in a smaller size when its position is away from the active area of the screen. Further or alternatively, when the position of a function control target is away from the active area of the screen, the function control target can be displayed in a faint mode. When the function control target is at the active area of the screen, the function control target can be expanded to show its related optional items. The related optional items can each be displayed in a particular mode, such as a flashing mode or a steady mode.

The fork-like OSD menu includes a vertical base part 211, a top prong 212, a middle prong 22, and a bottom prong 213. The middle prong 22 displays a configuration value of a selected optional item therein, and adjustment graduations for a user to adjust the configuration value. The base part 211 is the active area of the screen, and includes m (m being any natural number) spaces for displaying the related optional items of a selected function control target. The related optional item in a middle portion of the base part 211 is displayed in the flashing mode. The other related optional items in other portions of the base part 211 are displayed in the steady mode. The top prong 212 and the bottom prong 213 each include n (n being any natural number) spaces for displaying other function control targets therein.

If there are any related optional items of the function control target that cannot be shown in the finite space of the base part 211, these related optional items are hidden. Similarly, if there are any function control targets that cannot be shown in the finite space of the top prong 212 or the finite space of the bottom prong 214, these function control targets are hidden.

In the preferred embodiment, it is assumed that the number of function control targets N is 6, the number of spaces n is 2, and the number of spaces m is 5. Further, it is assumed that the function control targets 1 and 2 are in the top prong 212, the function control target 3 is in the base part 211 and includes 5 related optional items, and the function control targets 4 and 5 are in the bottom prong 213. For simplicity, the function control targets 1, 2, 4 and 5 are all displayed in the faint mode. Nevertheless, the description should not be construed as limiting the invention to the faint mode.

According to the above description, and referring to FIG. 2, the function control target 3 is expanded into its five related optional items with corresponding display symbols (e.g., Volume1, Contrast2, Brightness3, Horizontal Position4, and Vertical Position5) in the base part 211. Brightness3 is in the middle portion of the base part 211. The configuration value 54 of Brightness3 is displayed at the right side of the display symbol, and adjustment graduations are displayed in the middle prong 22. The function control targets 1, 2, 4, 5 in the top prong 212 and the bottom prong 213 are displayed in corresponding sizes based on their current coordinates. That is, the function control targets 2 and 4 are displayed in a larger size, and the function control targets 1 and 5 are displayed in a smaller size. The other function control target 6 of the bottom prong 213 is hidden.

Figure 3:
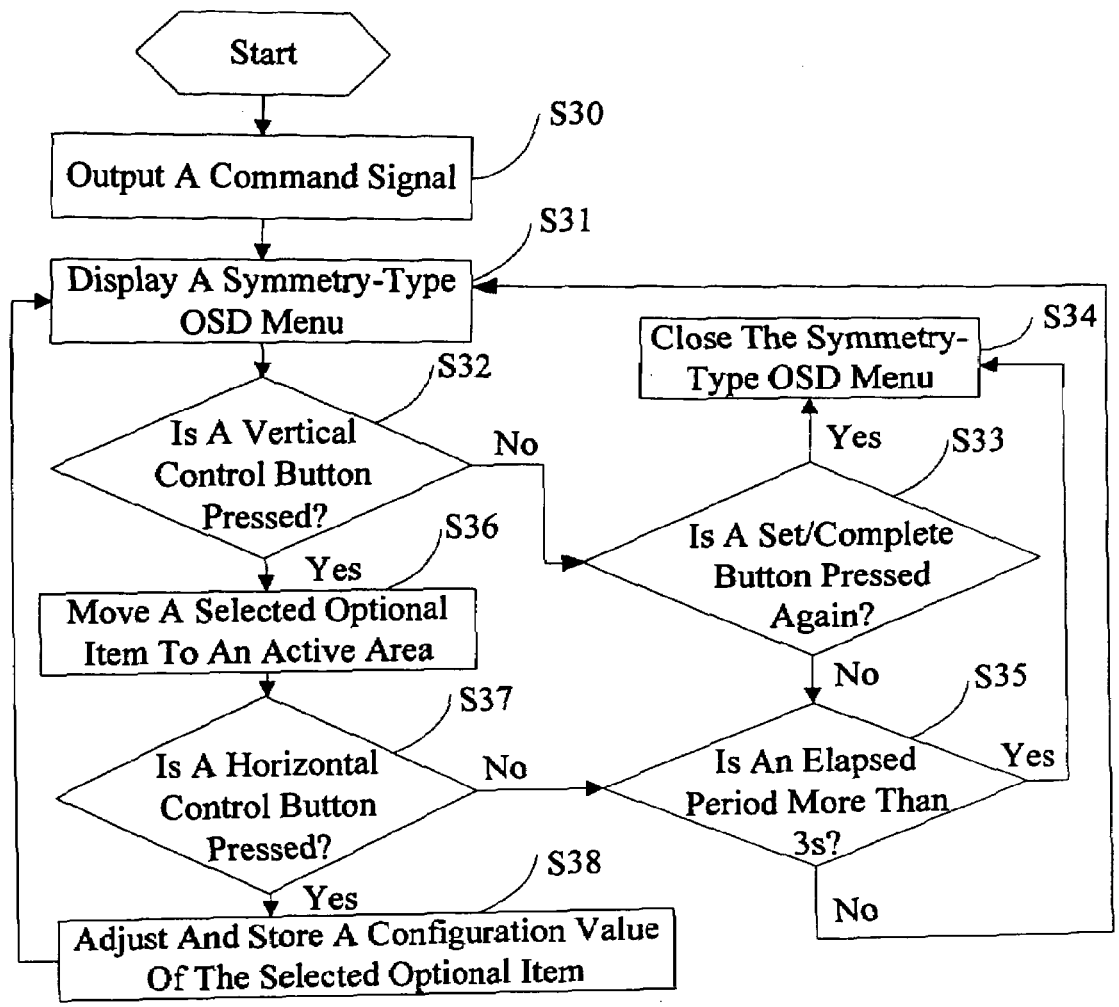
FIG. 3 is a flowchart of a preferred method for displaying and controlling a symmetry-type OSD menu in accordance with the present invention.
Figure 4:
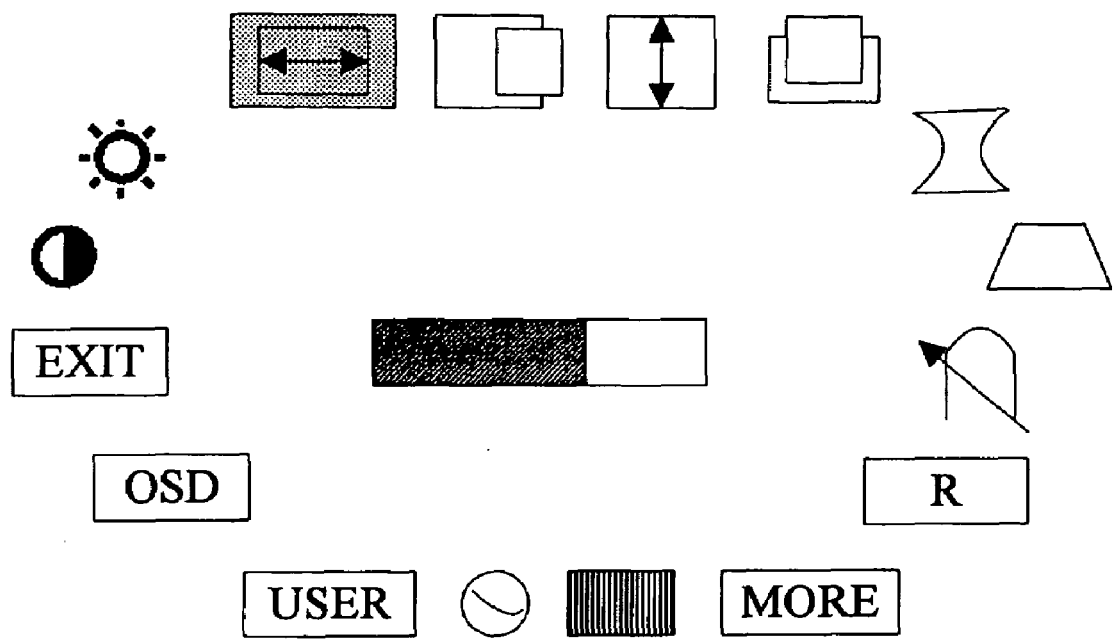
FIG. 4 is a schematic illustration of an OSD menu according to the prior art being displayed on a screen, the OSD menu comprising a plurality of optional items.

FIG. 3 is a flowchart of a preferred method for displaying and controlling a symmetry-type OSD menu according to the present invention. In step S30, the set/complete button 1 is pressed and outputs a command signal for displaying the symmetry-type OSD menu, such as that shown in FIG. 2. In step S31, the control unit 11 outputs a control signal and control data in accordance with the command signal, and the OSD menu generation unit 12 receives the control signal and the control data and displays the symmetry-type OSD menu on the screen of the image display device 17. In step S32, the control unit 11 determines whether either vertical control button 2 or 3 has been pressed to select a desired optional item to be adjusted. If either vertical control button 2 or 3 has been pressed, the procedure goes to step S36 described below. If neither of the vertical control buttons 2 and 3 has been pressed, in step S33, the control unit 11 determines whether the set/complete button 1 has been pressed again.

If the set/complete button 1 has been pressed again, in step S34, the symmetry-type OSD menu is closed, because the user wants to exit the symmetry-type OSD menu. If the set/complete button 1 has not been pressed again, in step S35, the control unit 11 determines whether an elapsed period of not receiving any command signals from the horizontal buttons 5 or 6 is more than 3 seconds. If the elapsed period of not receiving any command signals is more than 3 seconds, the procedure goes to step S34 described above. If the elapsed period of not receiving any command signals is not more than 3 seconds, the procedure returns to step S31 described above.

In step S36, the control unit 11 moves the selected optional item to the middle portion of the base part 211. In step S37, the control unit 11 determines whether either horizontal control button 4 or 5 has been pressed. If neither of the horizontal control buttons 4 and 5 has been pressed, the procedure returns to step S35 described above. If either horizontal control button 4 or 5 has been pressed, in step S38, the control unit 11 adjusts the configuration value of the selected optional item in the middle space of the base part 211 according to the command signals from the horizontal control button 4 or 5, and stores the adjusted configuration value in the storage unit 13. The procedure then returns to step S31 described above.

Although the present invention has been specifically described on the basis of a preferred embodiment and preferred method, the invention is not to be construed as being limited thereto. Various changes or modifications may be made to the embodiment and method without departing from the scope and spirit of the invention.

I claim:

1. An apparatus for displaying and controlling a symmetry-type on-screen display (OSD) menu in an image display device, the apparatus comprising:
   a key input unit for pressing or rotating by a user in order to output command signals for displaying and controlling function control targets in the symmetry-type OSD menu;
   a control unit for outputting control signals and control data to display and control the symmetry-type OSD menu according to the command signals;
   an OSD menu generation unit for receiving the control signals and the control data and outputting OSD image signals to display the symmetry-type OSD menu;
   a storage unit for storing the control data and configuration information of the function control targets and related optional items of the function control targets;
   an image signal output unit for outputting second image signals;
   a pre-amplifier for converting the OSD image signals and second image signals to predetermined voltages and outputting resultant values of the conversion; and
   an image output unit for amplifying and outputting the resultant values.

2. The apparatus according to claim 1, further comprising the image display device for displaying the resultant values received from the image output unit.

3. The apparatus according to claim 1, wherein each of the function control targets can be expanded into its one or more related optional items at an active area of the image display device.

4. The apparatus according to claim 1, wherein each of the function control targets can be displayed in a different size according to its display position.

5. The apparatus according to claim 1, wherein the configuration information of the function control targets comprises display symbols of the function control targets, and position coordinates of the function control targets at different display positions.

6. The apparatus according to claim 1, wherein the configuration information of the related optional items comprises configuration values, position coordinates, and display symbols of the related optional items.

7. An electronics-based method for displaying and controlling a symmetry-type on-screen display (OSD) menu in an image display device, the method comprising the steps of:
   (a) outputting a command signal for displaying the symmetry-type OSD menu;
   (b) displaying the symmetry-type OSD menu according to the command signal;
   (c) determining whether a desired optional item has been selected for adjustment;
   (d1) determining whether the symmetry-type OSD menu is required to be closed, if a desired optional item has not been selected for adjustment; or
   (d2) displaying the selected optional item in an active area of the image display device, if a desired optional item has been selected for adjustment;
   (e) determining whether an elapsed period of not receiving any command signals is more than a predetermined threshold period, if the symmetry-type OSD menu is not required to be closed;
   (f) keeping the symmetry-type OSD menu displayed, if the elapsed period is not more than the predetermined threshold period;
   (g) determining whether a configuration value of the selected optional item is required to be adjusted; and
   (h) adjusting the configuration value of the selected optional item and storing the adjusted configuration value, if the configuration value of the selected optional item is required to be adjusted.

8. The method according to claim 7, further comprising the step of closing the symmetry-type OSD menu if it is required to be closed.

9. The method according to claim 7, further comprising the step of closing the symmetry-type OSD menu, if the elapsed period is more than the predetermined threshold period.

10. The method according to claim 7, further comprising the step of returning to step (b), after adjusting and storing the configuration value of the selected optional item.

11. The method according to claim 7, wherein the symmetry-type OSD menu comprises a plurality of function control targets.

12. The method according to claim 11, wherein each of the function control targets comprises one or more related optional items, and the method further comprises the step of expanding one of the function control targets into its one or more related optional items at the active area of the image display device.

13. The method according to claim 11, further comprising the step of displaying one of the function control targets in a particular size according to its display position.

14. A method for displaying and controlling an on-screen display (OSD) menu on an image display device, comprising the steps of:

arranging control targets of said OSD menu to be displayed symmetrically;

displaying said OSD menu on said image display device by emphatically displaying one of said control targets when said one control target is moved into an active area; and allowing adjustment for a user-selective one of optional items of said emphatically displayed control targets in said active area by further emphatically displaying of said user-selective one of said optional items, wherein said user-selective one of said optional items of said emphatically displayed control targets is further emphatically displayed with adjustment graduation values.

* * * * *

UNITED STATES PATENT AND TRADEMARK OFFICE
CERTIFICATE OF CORRECTION

PATENT NO. : 7,595,840 B2
APPLICATION NO. : 11/172683
DATED : September 29, 2009
INVENTOR(S) : Kuan-Hong Hsieh It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1039 days.

Signed and Sealed this

Twenty-eighth Day of September, 2010

David J. Kappos
*Director of the United States Patent and Trademark Office*